(12) United States Patent
Liu et al.

(10) Patent No.: US 10,285,230 B2
(45) Date of Patent: May 7, 2019

(54) METHOD FOR LINE VOLTAGE LAMP TO WORK WITH MULTI SWITCH

(71) Applicant: LEDVANCE GmbH, Garching bei Munich (DE)

(72) Inventors: Yang Liu, Guangdong (CN); Kun Xiong, Guangdong (CN)

(73) Assignee: LEDVANCE GMBH, Garching bei Munich (DE)

( * ) Notice: Subject to any disclaimer, the term of this patent is extended or adjusted under 35 U.S.C. 154(b) by 0 days.

(21) Appl. No.: 16/129,061

(22) Filed: Sep. 12, 2018

(65) Prior Publication Data

US 2019/0104582 A1   Apr. 4, 2019

(30) Foreign Application Priority Data

Sep. 30, 2017  (CN) .......................... 2017 1 0915681

(51) Int. Cl.
*H05B 33/08*   (2006.01)

(52) U.S. Cl.
CPC ................................ *H05B 33/0815* (2013.01)

(58) Field of Classification Search
None
See application file for complete search history.

(56) References Cited

U.S. PATENT DOCUMENTS

2011/0140622 A1*  6/2011  Suzuki ............... H05B 33/0809
                                                                  315/224

* cited by examiner

*Primary Examiner* — Dedei K Hammond
(74) *Attorney, Agent, or Firm* — Hayes Soloway PC

(57) ABSTRACT

Driver for an LED lamp, including an LED driver for driving an LED, a voltage input port adapted to connect the driver to a multi switch as a power source, a voltage output port connecting the LED to the LED driver, and a bleeder circuit suppressing leakage current provided by the multi switch, wherein the bleeder circuit is connected in series between the voltage input port and the LED driver.

9 Claims, 3 Drawing Sheets

METHOD FOR LINE VOLTAGE LAMP TO WORK WITH MULTI SWITCH

CROSS-REFERENCE

This patent application claims the benefit of and priority to Chinese Patent Application No. 2017109156818 filed on Sep. 30, 2017, the entire disclosure of which is incorporated herein by reference.

TECHNICAL FIELD

The present invention relates to a driver for an LED lamp and an LED lamp comprising such a driver.

BACKGROUND

LED lamps are commonly known and widespread lighting devices as efficient alternatives for incandescent bulbs.

However, currently available LED lamps are not suitable to be connected to multi switches. In particular, as a small leakage current flows even if a multi switch arrangement is in the switched off state, an LED lamp connected to a multi switch arrangement still lights or at least flickers.

In particular, and referring to non-dim low power LED lamps, there is no solution known to the above mentioned problem but these lamps are specified not to be suitable with a multi switch arrangement.

SUMMARY OF THE INVENTION

In view of the afore-described disadvantages of currently known LED drivers, it is an object of the present invention to provide a driver for an LED lamp that is suitable to be connected for operation with a multi switch and preferably reduces or eliminates flickering of the LED lamp when connected to the multi switch.

This object is solved by a driver and an LED lamp according to the independent claims. Preferred embodiments are given by the dependent claims, the description and the drawings.

Accordingly, a driver for an LED lamp is provided. The driver comprises an LED driver for driving an LED, a voltage input port which is adapted to connect the driver to a multi switch as a power source, a voltage output port adapted for connecting the LED to the LED driver, and a bleeder circuit for suppressing leakage currents provided by the multi switch, wherein the bleeder circuit is connected in series between the voltage input port and the LED driver.

This arrangement enables to particularly decouple the LED from the unstable output of the multi switch.

In particular, a bleeder circuit, namely an active circuit, can be used to absorb the leakage current of the multi switch such that an effective suppression of the leakage current is achieved efficiently and the driver and attached LED can be used with a multi switch. In particular, using the arrangement as described, the multi switch is enabled by the driver to effectively switch even a non-dim low power LED.

The driver may comprise at least one voltage input port which is adapted to connect the driver to a multi switch, wherein the multi switch operates as a power source for the LED lamp, in particular for the at least one LED of the LED lamp. To operate the multi switch as a power source, the multi switch may be coupled to socket or any other source of electrical power.

The voltage input port of the driver may be connected to the bleeder circuit for suppressing leakage current provided by the multi switch. Hence, any leakage provided by the multi switch may be suppressed by the bleeder circuit.

The bleeder circuit may be connected in series with the voltage input port. Preferably, the bleeder circuit may comprise at least one transistor. Thus, the bleeder circuit may comprise at least one active component. Hence, the bleeder circuit is an active circuit. In addition, the bleeder circuit may also comprise at least one resistance or at least one resistor.

Furthermore, the bleeder circuit may be connected to the LED driver, preferably providing the voltage output port which is adapted for connecting the LED to the LED driver.

Thus, the bleeder circuit may be connected in series between the voltage input port and the LED driver. Preferably, the bleeder circuit is also connected in series between the voltage input port and the voltage output port.

In addition, or as an alternative, the bleeder circuit may be adapted to any voltage provided by the multi switch. Preferably, a diode bridge, connected between the voltage input port and the bleeder circuit, may be used to convert an AC line voltage to a DC voltage. Hence, the diode bridge is also configured to transfer a voltage.

Preferably, the LED driver may be an electronic control gear (also called ECG or electronic ballast) for regulating and limiting the current that is provided the LED lamp.

Preferably, the LED lamp may comprise a plurality of LEDs and the LED driver is adapted for an LED group comprising a plurality of LEDs. The plurality of LEDs may be connected in series. In a further preferred embodiment, the LED driver is adapted for LEDs emitting visible light, in particular white light.

According to at least one embodiment of the driver, the bleeder circuit may comprise at least one resistor. Hence, the leakage current is transformed in the bleeder circuit by the resistor, or a resistance, into thermal energy.

Preferably, the at least one resistor is designed such that the entire leakage current of the multi switch is absorbed. Thus, if the LED lamp is connected to a multi switch and there is a leakage to pass to the LED lamp, when the multi switch is switched off, the resistance absorbs the entire leakage such that the LED does not flicker. In particular, the leakage current does not pass through the bleeder circuit causing the LED of the LED lamp to flicker.

According to at least one embodiment of the driver, the bleeder circuit may comprise at least one transistor.

A transistor is an active component, in particular a semiconductor. The transistor may be a bipolar junction transistor or a Darlington transistor. Preferably, the transistor is a field-effect transistor, e.g. a MOSFET. Advantageously, a transistor can operate in a variable resistance area and therefore, a transistor may prevent the leakage current passing through the bleeder circuit but provide for dissipation of the leakage current.

Preferably, the transistor may be connected in series with the at least one resistance of the bleeder circuit.

In addition, the bleeder circuit may also comprise a control circuit for controlling the transistor such that if a leakage current occurs, the control circuit of the bleeder circuit switches the transistor into a state, also referred to as the first state or "on". Thus, the transistor is adapted for suppressing the leakage via the resistance.

In a preferred embodiment of the driver, the driver further may comprise at least one control circuit adapted for controlling the at least one transistor of the bleeder circuit.

Preferably, the control circuit may be part of the bleeder circuit and may comprise at least one diode, at a least one resistance and at least one transistor. Thus, the control circuit is adapted for switching the at least one transistor of the bleeder circuit. Therefore, the at least one transistor of the bleeder circuit comprises at least a first state, referring to as "on", and a second state, referring to as "off". When the multi switch turns off, the LED lamp is off, but there is a small leakage current still charging the LED driver, which causes the LED to flicker. At this state, the bleeder circuit is turned on, which leads the leakage current to pass through the bleeder circuit and therefore, this leakage current is dissipated by the bleeder circuit. When the multi switch turns on, the LED lamp light is on, the bleeder circuit is turned off and therefore, there is no current passing through the bleeder circuit in order to reduce the power dissipation. Hence, all input current is supplied to the LED driver.

In a preferred embodiment of the driver, the control circuit may be implemented into the bleeder circuit such that the at least one control circuit is further adapted for controlling a current output of the bleeder circuit via the at least one transistor.

Thus, the control circuit is arranged for suppressing any current provided by the multi switch.

In a preferred embodiment of the driver, the control circuit may have a circuit operating voltage and the voltage output port may have an LED operating voltage, wherein the circuit operating voltage is lower than the LED operating voltage.

Therefore, the control circuit is adapted to control the at least one transistor of the bleeder circuit in any voltage range lower than the operating voltage of the LED. Thus, no leakage may occur.

According to at least one embodiment of the driver, the driver further may comprise a capacity connected in series between the bleeder circuit and the LED driver.

The capacity may be integrated as filter or as decoupling capacitor.

Preferably, the capacity may be used for buffering the voltage provided by the bleeder circuit operating in the first or second state.

According to at least one embodiment of the driver, the driver may further comprise a diode bridge connected in series between the voltage input port and the bleeder circuit.

Preferably, the diode bridge may have the function of a rectifier and thus, the bleeder circuit is operable in DC.

Further an LED lamp may be provided in order to solve the above-mentioned objective. The LED lamp may comprise a driver as described above and at least one LED being connected to the voltage output port of the driver. That is to say, all features that are disclosed for the driver are also disclosed for the LED lamp and vice versa.

Thus, the LED lamp is also operable with multi switches.

In a further preferred embodiment of the LED lamp, the LED lamp may be a non-dimmable LED lamp and the power of the LED lamp may be less than 5 watt.

BRIEF DESCRIPTION OF THE DRAWINGS

Preferred embodiments of the invention will be explained in the following, having regard to the drawings.

DETAILED DESCRIPTION OF THE INVENTION

Figure 1:
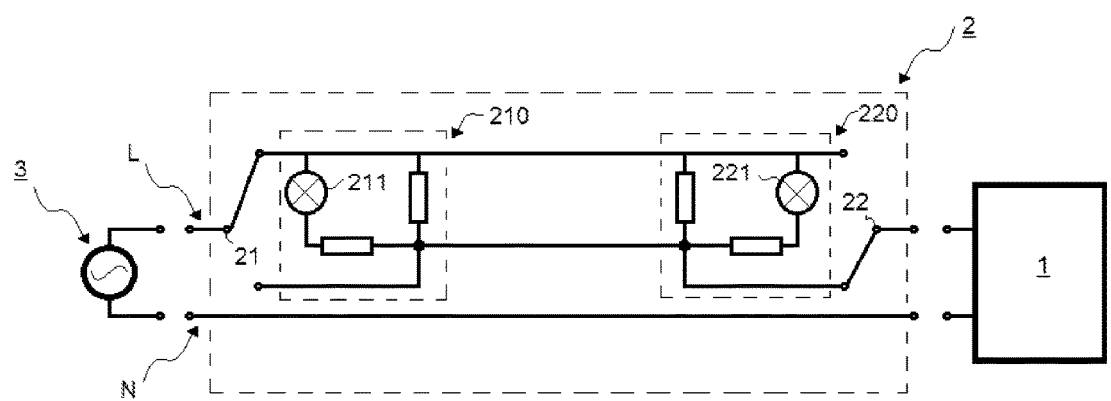
FIG. 1 shows an exemplary diagram of a multi switch connected to a power source, providing power to an LED lamp.

In the following, preferred embodiments of the invention will be described with reference to the drawings. Here, elements that are identical, similar or have an identical or similar effect are provided with the same reference numerals in the figures. Repeating the description of such elements may be omitted in order to prevent redundant descriptions.

The figures and the size relationships of the elements illustrated in the figures among one another should not be regarded as to scale. Rather, individual elements may be illustrated with an exaggerated size to enable better illustration and/or better understanding.

FIG. 1 shows in an exemplary diagram the typical structure of a multi switch 2 operably connected to a power source 3, providing power to an LED lamp 1.

The power source 3 is connected to the multi switch 2 via a power phase L and a neutral phase N.

In order to control the power provided by the power source 3, the multi switch 2 may comprise a first switch 21, a first pilot light circuit 210, a second switch 22 and a second pilot light circuit 220. The multi switch 2 may also comprise a third or a fourth switch or any number of switches greater than two.

The first switch 21, which is connected to the power source 3, is connected to a first pilot light circuit 210, which is connected to a second pilot light circuit, which is connected to a second switch 22, which is connected to the LED lamp 1.

The first and the second switch 21, 22 are interconnected with the power phase L. Both, the first and the second switch 21, 22, are electrically switchable between a first state and a second state. Depending on the switching state of the switches 21, 22, namely the first and the second state, the corresponding pilot lights 211, 221 of the pilot light circuits 210, 220 can indicate the state of the corresponding switch 21, 22.

The current intended to power the pilot lights 211, 221 is a very small current in the order of a few mA which is, however, also able to charge any capacity of the LED lamp 1. This small input current is also called a "leakage current" and may cause flicker of the LED lamp 1 due to the uncontrolled charging of any capacity of the LED lamp 1.

Figure 2:
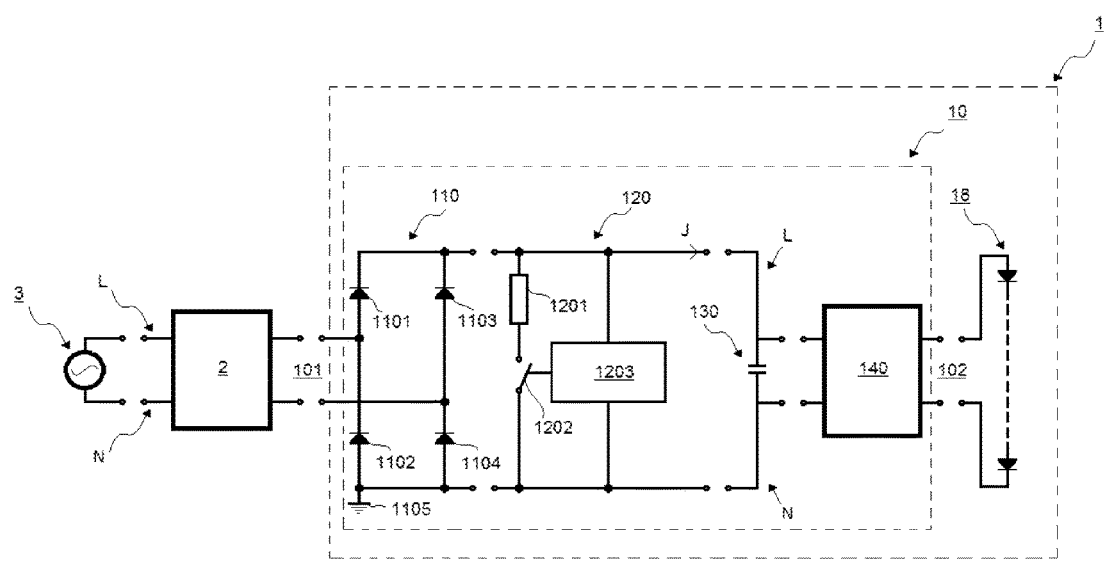
FIG. 2 shows an exemplary embodiment of an LED lamp comprising a driver according to the present description.

FIG. 2 shows an exemplary embodiment of an LED lamp 1, which is operably connected to the power source 3 via a multi switch 2.

The LED lamp 1 comprises a driver 10 and a plurality of LEDs 18.

The driver 10 comprises a voltage input port 101 which is adapted to connect the driver 10 to a multi switch 2 as source of power, preferably via a power phase L and a neutral phase N.

The driver 10 further comprises a diode bridge 110 which is connected in series with the voltage input port 101.

The diode bridge 101 comprises four diodes 1101, 1102, 1103, 1104 and is grounded via ground 1105. The four diodes 1101, 1102, 1103, 1104 are arranged as an H-bridge.

Further, the diode bridge 110 is connected to a bleeder circuit 120. Hence, the diode bridge 110 is connected in series between the voltage input port 101 and the bleeder circuit 120.

The bleeder circuit 120 comprises one resistor 1201, a switch, in particular a transistor 1202, and a control circuit 1203, which is adapted for controlling the transistor 1202 of the bleeder circuit.

The control circuit 1203 is implemented into the bleeder circuit 120 such that the control circuit 1203 is further adapted for controlling the current output J of the bleeder circuit 120 via the transistor 1202. The control circuit 1203 further has a circuit operating voltage (not shown).

Moreover, the driver 10 comprises a capacity 130 which is connected in series between the bleeder circuit and the LED driver 140.

The driver 10 also comprises a voltage output port 102 which is adapted for connecting the driver 10 to the plurality of LEDs 18. Thus, at least one LED of the plurality of LEDs 18 is connected to the voltage output port 102 of the driver 10. Thus, the voltage output port 102 has an LED operating voltage (not shown).

According to a preferred embodiment, the circuit operating voltage of the control circuit 1203 is lower than the LED operating voltage of the voltage output port 102, and thus, the bleeder circuit is arranged for suppressing the leakage current provided by the multi switch 2.

Preferably, the bleeder circuit 120 is connected in series between the voltage input port 101 and the LED driver 140 and the capacity 130 is connected in series between the bleeder circuit 120 and the LED driver 140.

The operating principle of the arrangement shown in FIG. 2 may be described as follows:

When the multi switch 2 is switched off, the still active leakage current J will charge the capacity 130. The capacity voltage will be increased slowly. Once the voltage of capacity reaches the operating voltage of the control circuit 1203 of the bleeder circuit 120, the control circuit 1203 will turn on the switch 1202 to discharge the capacity current. Thus, the voltage of the capacity 130 will be reduced. So the voltage of capacity 130 will never exceed the operating voltage of control circuit 1203.

Since the operating voltage of control circuit 1203 is lower than the operating voltage of the LEDs 18, the LEDs 18 will not flicker.

When the multi switch 2 switches on, the voltage of the power phase L will connect to the control circuit 1203 and the capacity 130.

If the control circuit 1203 detects a voltage that is higher than any previously set voltage, e.g. 60V or 70V, the control circuit 1203 will switch off the transistor 1202. Thus, the bleeder circuit 120 will not provide for additional power dissipation when the multi switch 2 is switched on.

Thus, a driver 10 is provided being operable with any kind of multi switches.

Figure 3:
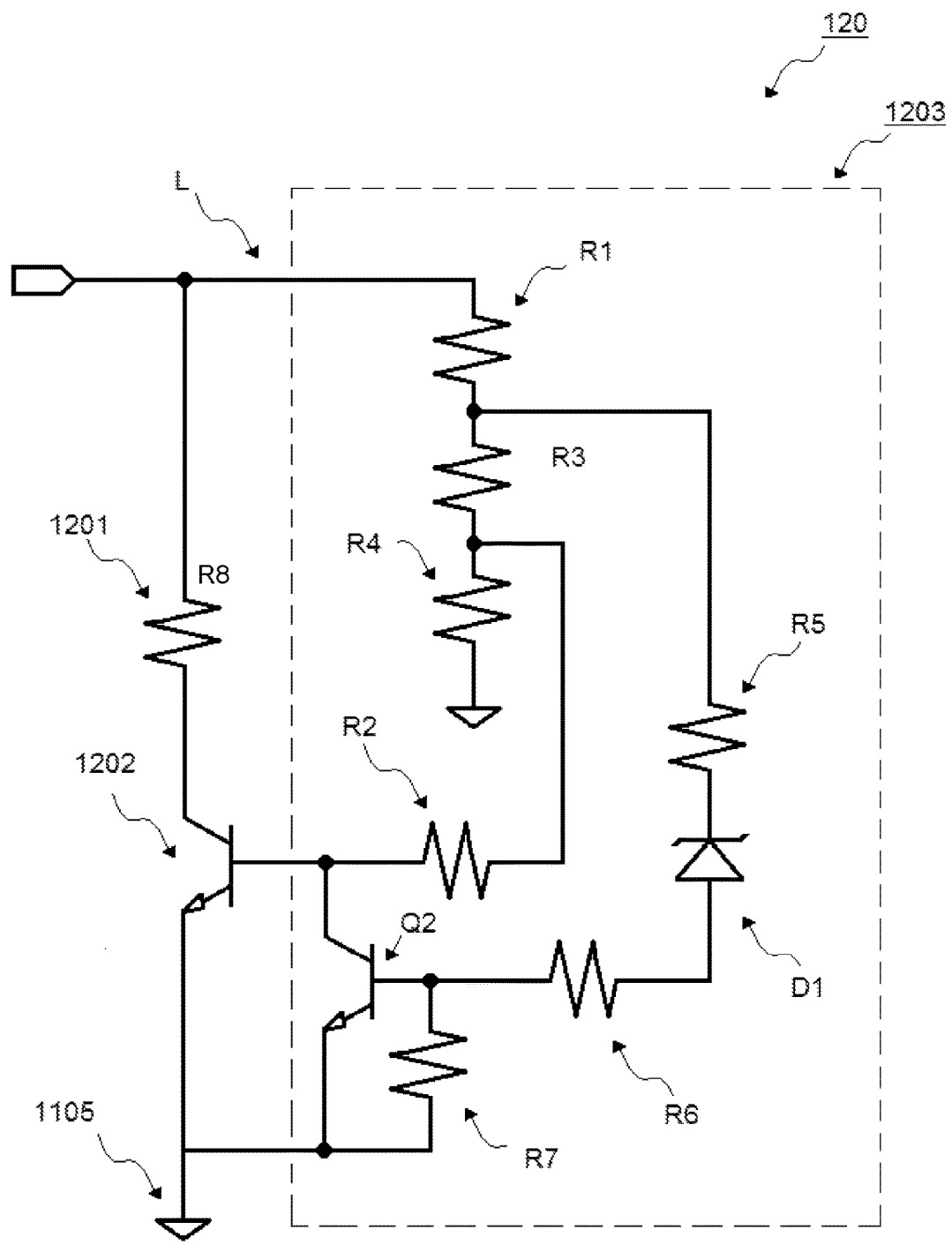
FIG. 3 shows an exemplary embodiment of a bleeder circuit of a driver according to the present description.

A preferred embodiment of the bleeder circuit 120 is shown in FIG. 3.

FIG. 3 shows a preferred embodiment of a bleeder circuit 120 of the driver 10.

The bleeder circuit 120 comprises a resistor 1201 with a resistance R8 and a transistor 1202, which are connected in series. The transistor 1202 is controlled by a control circuit 1203.

Via the power phase L which is part of the structure of the driver as shown in FIG. 2, the voltage provided to the bleeder circuit 120 is rectified due to the diode bridge, also called rectifier bridge. Preferably, this input voltage on the power phase is about 60V.

The control circuit 1203 which is adapted for controlling the transistor 1202 of the bleeder circuit 120, comprises a first, a second, a third, a fourth, a fifth, a sixth and a seventh resistance R1, R2, R3, R4, R5, R6, R7 as well as Zener diode D1 and transistor Q2 and resistance R8 of the resistor 1201.

Preferably, the resistances R2, R5, R6, R7, R8 are ten times smaller than the resistances R1, R3, R4. For example, R8 is 10 k Ohm and R3 100k Ohm, preferably 200 k Ohm. The operating voltage of the Zener diode may be about one fifth of the input voltage, e.g. 10 V.

The operating principle of the arrangement shown in FIG. 3 may be described as follows:

In the switched off state, when the power line voltage is about 60V and the Zener diode is about 10 V and the transistor Q2 has a low base voltage, the transistor Q2 is open. Hence, the transistor of the bleeder circuit 1202 works in an amplifier state. In other words, there may be a current about 4 mA through resistance R8, which means there is no current to charge the capacity 130 (shown in FIG. 2). Hence, there is no leakage current, which means the LEDs 18 are off and no flicker appears.

In the switch on state, when the power line voltage is about 300 V, the transistor Q2 has a high base voltage. Hence, the transistor Q2 is closed. Thus, the transistor 1202 connects to ground 1105. When base voltage of the transistor 1202 is low, the transistor switches off and the bleeder circuit 120 is turned off also.

With the driver 10 described herein, the LED flicker problem due to multi switches is solved. Moreover, the provided driver 10 has only a small power dissipation due to the optimized structure of the control circuit (which is shown in FIG. 3). Furthermore, the bleeder circuit 120 can be combined with any non-dimmable LED driver, and will not affect the performance of the LED driver.

The invention is not restricted by the description based on the embodiments. Rather, the invention comprises any new feature and also any combination of features, including in particular any combination of features in the patent claims, even if this feature or this combination itself is not explicitly specified in the patent claims or exemplary embodiments.

LIST OF REFERENCE NUMERALS

1 LED lamp
10 driver
101 voltage input port
102 voltage output port
110 diode bridge
1101 first diode of the diode bridge
1102 second diode of the diode bridge
1103 third diode of the diode bridge
1104 fourth diode of the diode bridge
1105 ground of the diode bridge
120 bleeder circuit
1201 resistor of the bleeder circuit
1202 transistor of the bleeder circuit
1203 control circuit of the bleeder circuit
130 capacity of the driver
140 LED driver of the driver
18 plurality of LEDs
2 multi switch
21 first switch
210 first pilot light circuit
211 first pilot light
22 second switch
220 second pilot light circuit
221 second pilot light
3 power source
L power phase
J current output of the bleeder circuit
N neutral phase
R1 . . . 7 resistances of the control circuit
D1 Zener diode of the control circuit
Q2 transistor of the control circuit

The invention claimed is:

1. A driver for an LED lamp, comprising
an LED driver for driving an LED;
a voltage input port which is adapted to connect the driver to a multi switch as a power source;

a voltage output port adapted for connecting the LED to the LED driver; and a bleeder circuit for suppressing leakage current provided by the multi switch, wherein the bleeder circuit is connected in series between the voltage input port and the LED driver.

2. The driver according to claim 1, wherein the bleeder circuit comprises at least one resistor.

3. The driver according to claim 1, wherein the bleeder circuit comprises at least one transistor.

4. The driver according to claim 3, further comprising at least one control circuit adapted for controlling the at least one transistor of the bleeder circuit.

5. The driver according to claim 4, wherein the control circuit is implemented into the bleeder circuit such that the at least one control circuit is further adapted for controlling a current output of the bleeder circuit via the at least one transistor.

6. The driver according to claim 5, wherein the control circuit has a circuit operating voltage and the voltage output port has an LED operating voltage, wherein the circuit operating voltage is lower than the LED operating voltage.

7. The driver according to claim 1, further comprising a capacitor connected in series between the bleeder circuit and the LED driver.

8. The driver according to claim 1, further comprising a diode bridge connected in series between the voltage input port and the bleeder circuit.

9. A lamp comprising at least one driver according to claim 1, wherein at least one LED is connected to the voltage output port of the driver.

* * * * *